Patented Nov. 18, 1947

2,430,910

UNITED STATES PATENT OFFICE 2,430,910

PROCESS FOR OBTAINING N-ALKOXY-METHYL POLYAMIDES

William Hale Charch, Buffalo, N. Y., assignor to E. I. du Pont de Nemours & Company, Wilmington, Del., a corporation of Delaware No Drawing. Application July 18, 1944,
Serial No. 545,534

7 Claims. (Cl. 260—72)

This invention relates to polymeric materials, and more particularly to the manufacture of certain modified polyamides of the nylon type.

The modified polyamides with which this invention is concerned, namely, the N-alkoxymethyl polyamides, are obtained in the manner more particularly pointed out hereinafter from the synthetic linear polyamides of the kind described in United States Patents 2,071,250; 2,071,253; and 2,130,948.

The above synthetic linear polyamides, which are soluble only in special solvents, can be converted to nitrogen substituted polyamides, which are referred to as N-alkoxymethyl polyamides and which are soluble in hot ethanol and in other common inexpensive solvents. These modified polyamides are made by methods which involve reacting the linear polyamides which have hydrogen-bearing carbonamide groups with formaldehyde and an alcohol in the presence of an oxygen containing acid. The procedure converts the functional group

in the case of the polyamides to the functional group

where R is the organic radical derived from the alcohol used. In one of these methods whereby the linear polyamides having a hydrogen bearing amide group are converted to the soluble N-alkoxymethyl polyamides, the linear polyamide is dissolved in the oxygen containing acid which most desirably is formic acid, and this solution is treated with a mixture of alcohol and paraformaldehyde.

A second or direct method for obtaining the N-alkoxymethyl polyamides consists in heating the synthetic linear polyamide with formaldehyde and alcohol in the presence of a small amount of the oxygen containing acid which in this method is most advantageously phosphoric acid. The method, however, has previously presented a difficulty in that the primary polyamide chain is always degraded to a certain extent and the products consequently have less desirable properties for certain uses. In the usual operation of the direct process the polyamide, formaldehyde, alcohol, water, and the acid catalyst is placed in a vessel and heated to reaction temperature, usually about 120°–140° C. When such a reaction mixture involves a volatile alcohol considerable pressure may be developed at these temperatures and heavy, sealed equipment is used, which in turn requires a long period to reach the desired temperature. In addition in the preparation of large scale batches a long heating time to reach reaction temperature is also usually needed. This long heating in the presence of acid resulted in degradation of the polyamide chain probably as a result of hydrolysis or alcoholysis of the amide linkages. When high boiling alcohols are used, pressure equipment is not necessary.

This invention has as an object an improved method for the production of N-alkoxymethyl polyamides by the last mentioned method which involves reaction in the presence of phosphoric acid but which very substantially reduces the degradation of the polyamide chain previously referred to. Other objects will appear hereinafter.

The above objects are accomplished by a method wherein the oxygen-containing acid, which is one having an ionization at least as great as $9.6 \times 10^{-6}$ and an equivalent conductance, measured at 25° C. in 0.01 N concentrations, no greater than 370 ohms$^{-1}$ cm.$^2$, is withheld from the reaction mixture of polyamide, formaldehyde, and alcohol until these ingredients have reached reaction temperature whereupon the oxygen-containing acid is added to the reaction mixture and the reaction continued until the desired degree of alkoxymethyl substitution has taken place.

The extent of degradation of the primary polyamide chain has been estimated by the measurement of the absolute viscosity of solutions of the N-alkoxymethyl polyamide in 85% aqueous phenol. The procedure consists in preparing a 5% solution of the polyamide in 85% phenol-15% water and determining the viscosity by standard methods. The improvement in viscosity in the polymers resulting from the present process over the polymers resulting from the same reactants and under the same reaction conditions wherein the acid catalyst was initially included with the other reactants is shown by the fact that a polymer obtained by the prior art method had an absolute viscosity of 42.8 centipoises as compared to 83.1 centipoises for the polymer obtained by the improved method described herein.

A preferred method of carrying out the invention is as follows: One part of the solid polyamide, preferably polyhexamethylene adipamide, 0.96 part paraformaldehyde, 0.28 part water, 1.25 parts methanol, and 0.00125 part sodium hydroxide is charged into a well-agitated pressure vessel. The mixture is heated until the inside temperature is 137° C. and 0.036 part 85% phosphoric acid is injected rapidly (10-15 seconds). The mixture is held at 137° C. for 8 minutes after the injection of the catalyst and is then forced out of the reaction vessel into an aqueous methanol solution containing sufficient ammonia to neutralize the phosphoric acid. The resulting polymer solution is clarified by suitable filtration or centrifugation and the polymer isolated by evaporation of the solvent or addition of a non-solvent for the polymer, such as water.

The product prepared as described here has about 35% of the amide groups substituted with methoxymethyl groups. This amount of substitution can be varied by changing the amounts of water or formaldehyde. Increasing the amount of water reduces the amount of substitution, while increasing the amount of formaldehyde increases the degree of substitution. In these products there is also a small quantity of unetherified methylol groups. The amount of methylol groups can be varied by variation of the methanol-formaldehyde-$H_2O$ proportions. Increasing methanol with respect to formaldehyde and water decreases the amount of methylol groups present. The small amount of sodium hydroxide which is used is added in order to depolymerize the paraformaldehyde and to assist in the solution of the paraformaldehyde in the methanol.

The invention is further illustrated by the following examples in which the parts are by weight:

*Example I*

In a nickel autoclave was placed 750 parts of polyhexamethylene adipamide (intrinsic viscosity about 1.20) pulverized to 20–40 mesh, 750 parts paraformaldehyde, 1540 parts absolute ethanol and 95 parts water and the mixture heated with stirring to a temperature of 120° C. At this temperature a solution of 25.6 parts of 85% phosphoric acid in 80 parts absolute ethanol was forced into the mixture under pressure. The mixture was maintained at 120°–125° C. for about 20 minutes and then extruded into a solution of aqueous ethanol containing sufficient ammonia to neutralize the catalyst. The solution was filtered to remove the small amount of insoluble material present and the clear filtrate was poured into hot aqueous alkali. The N-ethoxymethyl polyhexamethylene adipamide separated as a soft plastic mass which stiffened rapidly. This was broken up and washed thoroughly in running water and finally dried in vacuum at 50° C. This product was found to contain 11.25% ethoxyl by weight and to have a viscosity of 71.1 centipoises for a 5% solution in 85% phenol.

Control experiments using same procedure and materials but mixing the catalyst with other reagents prior to heating gave products of viscosity around 60 centipoises.

*Example II*

In a stainless steel autoclave was placed 100 parts of polyhexamethylene adipamide (intrinsic viscosity>1.0) pulverized to pass 20 mesh, 96 parts paraformaldehyde, 28.8 parts water, 125 parts methanol, and 0.25 part sodium hydroxide. This mixture was heated with agitation to 137° C. and 3.6 parts of 85% phosphoric acid was injected rapidly (10–15 seconds). The reaction mixture was held at 137° C. for 8 minutes after the addition of the catalyst and then discharged rapidly (less than 2 minutes) into a solution containing 256 parts methanol, 80 parts water, and 8 parts 28% aqueous ammonia. The resulting solution was clarified by filtration and the polymer precipitated by the gradual addition of water. The product was a white granular product which was separated by filtration and washed thoroughly with water. This N-methoxymethyl polyhexamethylene adipamide was found to be readily soluble in hot 80% ethanol and clear, strong films could be cast from such solutions. This product contained 1.43% by weight of unetherified methylol groups, 6.46% by weight of methoxyl groups which corresponds to a total amide substitution of about 33%. A 5% solution in 85% phenol had a viscosity of 102 centipoises.

Control experiments using same procedure and materials but mixing catalyst with other reagents prior to heating gave products of viscosity 30 to 60 centipoises.

*Example III*

A highly substituted N-alkoxymethyl polyamide suitable for the preparation of elastic fibers is obtained by the following procedure: Into a nickel autoclave was charged 600 parts polyhexamethylene adipamide pulverized to pass 20 mesh, 660 parts paraformaldehyde and 925 parts methanol. The mixture was heated with agitation to 137° C. and a solution of 20.5 parts phosphoric acid dissolved in 4.8 parts methanol was injected into the mixture. The temperature was maintained at 137° C. for 8 minutes and the product discharged into a solution of aqueous methanol containing sufficient ammonia to neutralize the catalyst. The resulting polymer solution was clarified by filtration and the polymer precipitated by pouring the filtrate into water. The N-methoxymethyl polyhexamethylene adipamide separated as a soft plastic mass which was washed by working on wash rolls under a stream of water. After all the aldehyde had been removed, the plastic product was dried in the form of thin sheets. This product was found to contain 11.51% methoxyl which corresponds to about 50% of the amide groups substituted by methoxymethyl groups. The viscosity of this product in 5% solution in 85% phenol was 84.8 centipoises.

*Example IV*

In an enamel-lined autoclave was placed 65 parts of polyhexamethylene adipamide, 65 parts paraformaldehyde, 165 parts isobutyl alcohol and 25 parts water. The entire mixture was heated with agitation to 147° C. and 2.56 parts phosphoric acid injected into the mixture. The temperature was maintained about 147° C. for 21 minutes, and the solution then discharged into isobutyl alcohol containing sufficient ammonia to neutralize the catalyst. The solution was clarified by filtration and the polymer precipitated by pouring the filtrate into water. The soft plastic mass which separated was washed free of formaldehyde and alcohol on the wash rolls and finally dried at 50° C. This sample of N-isobutoxymethyl polyamide was found to have a viscosity of 55.3 centipoises in 5% solution in 85% phenol and to contain 9.8% combined formaldehyde which corresponds to 52% of the amide groups substituted by N-isobutoxymethyl groups.

Further examples of acid catalysts useful in this invention and having an ionization constant within the range previously mentioned are p-toluenesulfonic acid, maleic acid, oxalic, acetic, formic, hydroxyacetic, acids of phosphorus, etc.

The reaction can be carried out at temperatures from 50° C. to 200° C., and at pressures of from atmospheric to about 500 pounds per square inch. The reaction is usually continued from 1 to 200 minutes after addition of the acid catalyst although this time will vary somewhat depending upon the degree of substitution desired and the temperature.

Examples of additional alcohols that can be used in carrying out this invention are methanol, propanol, isopropanol, butanol, oleyl alcohol, lauryl alcohol, benzyl alcohol, ethylene glycol, alcohols containing hetero atoms such as methyl ether of ethylene glycol, methyl glycolate, and unsaturated alcohols such as allyl alcohol. If a mixed alkoxymethyl polyamide is desired a mixture of alcohols can be used.

The formaldehyde is best used in an amount of from 0.1 to 10 parts per part of polyamide. It is usually desirable to use the formaldehyde and alcohol in a 1 to 1.5 molar ratio, but the molar ratio of formaldehyde to alcohol can be varied from about 2:1 to 0.1:1. Any of the ordinary forms of formaldehyde, such as paraformaldehyde and trioxane, as well as various formaldehyde liberating substances, such as methylal and hexamethylenetetramine can be used.

The polyamides useful in this invention, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above-mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acid, and amino alcohols is intended to include the equivalent amide-forming derivatives of these reactants. The preferred polyamides obtained from these reactants have a unit length of at least 7, where "unit length" is defined as in United States Patents 2,071,253 and 2,130,948 and an intrinsic viscosity of at least 0.4. The average number of carbon atoms separating the amide groups in these polyamides is at least two. These linear polyamides include also polymers, as for instance the polyesteramides, obtained by admixture of other linear polymer-forming reactants, as for instance glycol-dibasic acid mixtures or hydroxy acids, with the mentioned polyamide-forming reactants. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid. The term "polyamide" is used in its broad sense and includes polythioamides, for example those described in United States Patent 2,201,172, and polysulfonamides, for example those obtained by reacting a disulfonyl halide with a diamine as described in United States Patents 2,321,890 and 2,321,891.

The N-alkoxymethyl polyamides can be used as unsupported wrapping film, as coatings on fabric for use as a leather substitute, as an adhesive, as fibers, particularly as elastic fibers, and as molded articles. The high viscosity products obtained by use of this invention have greater flex durability, higher tear resistance and better elastic recovery than low viscosity products. The N-alkoxymethyl polyamides can also be used as inter-layers in safety glass in which sheets of glass or plastics are separated by these substituted polyamides.

As many apparently widely different embodiments of this invention may be made without departing from the spirit and scope thereof, it is to be understood that I do not limit myself to the specific embodiments thereof except as defined in the appended claims.

I claim:

1. In a process for obtaining N-alkoxymethyl polyamides by reacting formaldehyde, alcohol, an acid catalyst and a synthetic linear polyamide of intrinsic viscosity of at least 0.4 and having hydrogen-bearing carbonamide groups as an integral part of the main polymer chain, the step which comprises heating to reaction temperature reactants consisting of the formaldehyde, an alcohol in which the sole reactive groups consist of alcoholic hydroxyl, and said last-mentioned polyamide in the absence of said acid catalyst, then adding to the reaction mixture an oxygen-containing acid and continuing the reaction the formaldehyde being present in an amount by weight of from 0.1 to 10 parts per part of polyamide and in a molar ratio of from 2 to 0.1 mols per mol of alcohol, said oxygen-containing acid having an ionization constant at least as great as $9.6 \times 10^{-6}$ and an equivalent conductance, measured at 25° C. in 0.01N concentration, no greater than 370 ohms$^{-1}$ cm.$^2$, said synthetic linear polyamide having a unit length of at least 7 and having an average number of carbon atoms of at least two separating the amide groups.

2. In a process for obtaining N-alkoxymethyl polyamides by reacting formaldehyde, alcohol, an acid catalyst and a synthetic linear polyamide of intrinsic viscosity of at least 0.4 and having hydrogen-bearing carbonamide groups as an integral part of the main polymer chain, the improvement in said process which comprises heating to reaction temperature under pressure reactants consisting of the formaldehyde, an alcohol in which the sole reactive groups consist of alcoholic hydroxyl, and said last-mentioned polyamide in the absence of said acid catalyst, and then injecting into the reaction mixture an oxygen-containing acid and continuing the reaction the formaldehyde being present in an amount by weight of from 0.1 to 10 parts per part of polyamide and in a molar ratio of from 2 to 0.1 mols per mol of alcohol, said oxygen-containing acid having an ionization constant at least as great as $9.6 \times 10^{-6}$ and an equivalent conductance, measured at 25° C. in 0.01N concentration, no greater than 370 ohms$^{-1}$ cm.$^2$, said synthetic linear polyamide having a unit length of at least 7 and having an average number of carbon atoms of at least two separating the amide groups.

3. The process set forth in claim 1 in which said oxygen-containing acid is phosphoric acid.

4. The process set forth in claim 2 in which said oxygen-containing acid is phosphoric acid.

5. The process set forth in claim 1 in which said oxygen-containing acid is phosphoric acid and in which the alcohol is methanol.

6. The process set forth in claim 2 in which said oxygen-containing acid is phosphoric acid and in which the alcohol is methanol.

7. The process set forth in claim 1 in which said oxygen-containing acid is phosphoric acid, the alcohol is methanol, and the synthetic linear polyamide is polyhexamethylene adipamide.

WILLIAM HALE CHARCH.

REFERENCES CITED

The following references are of record in the file of this patent:

UNITED STATES PATENTS

| Number | Name | Date |
|---|---|---|
| 2,244,184 | Austin et al. | June 3, 1941 |
| 2,317,181 | D'Alelio | Apr. 30, 1943 |
| 2,413,697 | Edgar | Jan. 7, 1947 |